C. A. Codding,
Soldering Clamp.

N° 44,605. Patented Oct. 11, 1864.

Witnesses.
Jonathan Hoag
O. R. Smith

Inventor.
C. A. Codding

UNITED STATES PATENT OFFICE.

C. A. CODDING, OF BATTLE CREEK, MICHIGAN.

IMPROVEMENT IN FINISHING EAVES-TROUGHS.

Specification forming part of Letters Patent No. 44,605, dated October 11, 1864; antedated September 30, 1864.

*To all whom it may concern:*

Be it known that I, C. A. CODDING, of Battle Creek, in the county of Calhoun and State of Michigan, have invented a new Improved Machine for Making Eaves-Troughs; and I do hereby declare the following to be a full and exact description thereof, reference being had to the accompanying drawings, making part of this specification, in which—

Figure 1:
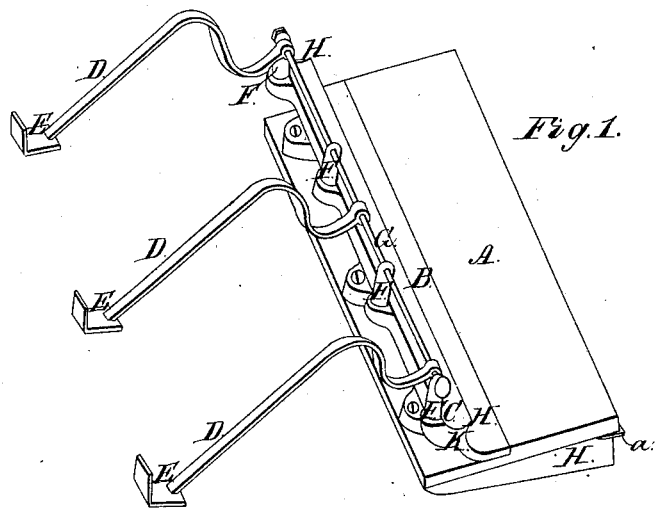
Figure 2:
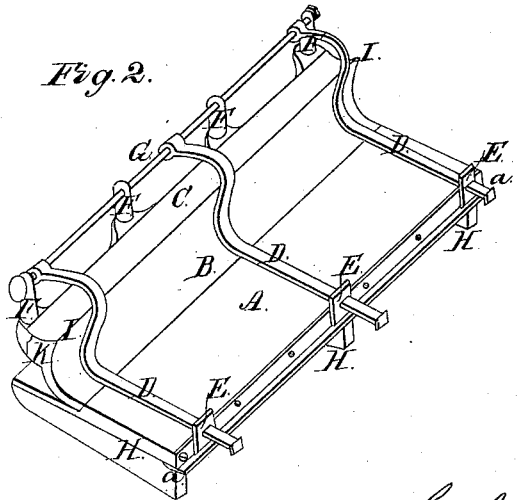

Figure 1 is a perspective view of my improved machine, showing the levers, to be hereinafter described, thrown back out of contact with the trough-platform. Fig. 2 is a similar view, looking from the opposite side, representing the levers as held in contact with the trough-platform.

Similar letters of reference indicate corresponding parts in the several figures.

The object of this invention is to produce a machine whereby the articles commonly denominated "flat eaves-troughs" may have the finishing or completing operation in their manufacture performed in a more effectual and expeditious manner, and by which the difficulty attending the use of devices hitherto employed to effect this finishing process may be altogether obviated.

To this end the invention consists in constructing a platform or bed corresponding in form to the troughs, and providing to operate, in conjunction therewith, a series of levers, by means of which the trough may be firmly held in proper position while undergoing the soldering or finishing process, as will be hereinafter fully explained.

In order that others skilled in the art to which my invention appertains may be enabled to fully understand and use the same, I will proceed to describe its construction and operation.

In the accompanying drawings, A represents a platform mounted upon inclined supports H H H, so as to give the same the requisite pitch to adapt it to conform to the main body of the trough to be soldered. This platform A is provided with a continuous longitudinal groove, $a\ a$, which provides means for holding down the levers D, to be presently described.

K represents a section or piece securely attached to the platform A, and formed with a groove, B, to receive the convex portion of the main body of the trough, and groove C, for the reception of the bead on the trough, the partition I I between the grooves B and C being adapted to fit between the bead and body of the trough.

F F F F represent a series of rigid posts rising from the section K. Through these posts is inserted a rod, G, upon which are loosely pivoted a series of levers, D D D, the ends of the latter being furnished with hooks E E E, which, being inserted in the groove $a\ a$, serve to hold the levers snugly in contact with the trough when adjusted in position upon the platform A. These levers are so constructed that when turned down in the manner illustrated in Fig. 2 they will form a suitable arch over the groove C, to accommodate the bead of the trough and press snugly against that portion of the latter which occupies the groove or concave B.

The manner of carrying this invention into effect will be readily understood. The levers D being thrown back into the position represented in Fig. 1, and the ends of the trough having been slipped together in a customary manner, all that remains to be done in order to complete the work is to adjust the trough in proper position upon the platform, turn down the levers D, and secure the same by inserting the hooks E in the groove $a\ a$, as explained. The trough may thus be held in an immovable position, and the workman enabled to perform the necessary soldering with the greatest facility.

The levers D are adapted to slide upon the rod G, so that when pieces of different lengths are to be soldered they may be moved in either direction upon the rod G in order to hold down the ends and flaps.

Having thus described my invention, what I claim as new therein, and desire to secure by Letters Patent, is—

The combination, with the bed or platform A and concaves B and C, of the adjustably-pivoted levers D and hooks E, the whole being constructed and arranged in the manner and for the purpose herein set forth.

C. A. CODDING.

Witnesses:
O. R. SMITH,
C. S. DENT.